US012776175B2

(12) United States Patent
Filipov et al.

(10) Patent No.: US 12,776,175 B2
(45) Date of Patent: Oct. 27, 2026

(54) CLOUD-BASED MANAGEMENT OF VEHICLE RUN-TIME DATA

(71) Applicant: Remotive Labs AB, Malmö (SE)

(72) Inventors: Aleksandar Filipov, Limhamn (SE); Per Sigurdson, Bunkeflostrand (SE)

(73) Assignee: Remotive Labs AB, Malmö (SE)

( * ) Notice: Subject to any disclaimer, the term of this patent is extended or adjusted under 35 U.S.C. 154(b) by 0 days.

(21) Appl. No.: 19/148,174

(22) PCT Filed: Jan. 23, 2024

(86) PCT No.: PCT/SE2024/050057

§ 371 (c)(1),
(2) Date: Jul. 15, 2025

(87) PCT Pub. No.: WO2024/158331

PCT Pub. Date: Aug. 2, 2024

(65) Prior Publication Data

US 2026/0237256 A1 Aug. 13, 2026

(30) Foreign Application Priority Data

Jan. 27, 2023 (SE) .................................... 2350080-4

(51) Int. Cl.
*G07C 5/08* (2006.01)
*G07C 5/00* (2006.01)

(52) U.S. Cl.
CPC ............. *G07C 5/085* (2013.01); *G07C 5/008* (2013.01); *G07C 5/0808* (2013.01); *G07C 5/0816* (2013.01)

(58) Field of Classification Search
CPC ...... G07C 5/085; G07C 5/008; G07C 5/0808; G07C 5/0816
See application file for complete search history.

(56) References Cited

U.S. PATENT DOCUMENTS 10,650,621 B1 5/2020 King et al.
10,991,172 B1 * 4/2021 Oakes, III .............. G07C 5/008
(Continued)

FOREIGN PATENT DOCUMENTS

EP 3584703 A1 12/2019
EP 3608773 A1 2/2020
WO 2022222657 A1 10/2022

OTHER PUBLICATIONS

Danquah et al, W. Vehicular Cloud Resource Management, Issues and Challenges: A Survey, Google Scholar, IEEE Access, vol. 8, Oct. 2020, pp. 180587-180607. (Year: 2020).*

*Primary Examiner* — Russell Frejd
(74) *Attorney, Agent, or Firm* — Capitol City TechLaw

(57) ABSTRACT

A computerized system for cloud-based management of vehicle run-time data may include a cloud-based computing resource, a client-side platform, and a signal broker device. The signal broker device may be connected to a vehicle having vehicle components and further configured for interfacing the cloud-based computing resource. The cloud-based computing resource may be configured to automatically log run-time data of an ongoing operation of the vehicle in log files, and enable cloud-based access to the log files. The client-side platform may be configured to access the log files from the cloud-based computing resource, and provide one or more software tooling instructions to the vehicle based on the run-time data of the log files. The software tooling instructions may be adapted to assess functionalities of the vehicle components.

15 Claims, 5 Drawing Sheets

(56) References Cited

U.S. PATENT DOCUMENTS

| | | | | |
|---|---|---|---|---|
| 11,508,191 | B1 | 11/2022 | Herron et al. | |
| 11,861,566 | B1 * | 1/2024 | Kobulnicky ....... | G06Q 30/0645 |
| 2017/0274855 | A1 * | 9/2017 | Laskey ................ | G08G 1/0141 |
| 2019/0244441 | A1 * | 8/2019 | Kyes .................... | G07C 5/0808 |
| 2019/0371091 | A1 | 12/2019 | Frisch et al. | |
| 2019/0391800 | A1 | 12/2019 | Lin et al. | |
| 2022/0284740 | A1 * | 9/2022 | Loesch ................ | G07C 5/0808 |
| 2023/0274592 | A1 * | 8/2023 | Sanchez ................ | B60W 40/09<br>701/33.4 |

* cited by examiner

CLOUD-BASED MANAGEMENT OF VEHICLE RUN-TIME DATA

This application claims priority under 35 USC 119 from SE patent application No. 2350080-4 filed on Jan. 27, 2023, the entire contents of which are incorporated herein by reference.

TECHNICAL FIELD

The present disclosure relates to a computerized system, a computer-implemented method and computer program product. More specifically, the present disclosure relates to a computerized system, a computer-implemented method and computer program product for cloud-based management of vehicle run-time data.

BACKGROUND

Managing electronic signals for automotive vehicles is an integral part of ensuring that a vehicle operates as intended, i.e. that a desired performance can be maintained and/or that vehicle components are not at risk of malfunctioning. Vehicle components being associated with poor performance or malfunctioning components may lead to hazardous situations. It is therefore of great importance that electronic signals in vehicles be properly assessed. Automotive vehicles comprise a substantial number of various vehicle components comprising a plurality of electronic control units (ECUs). Each one of these ECUs continuously generates electronic signals during ongoing vehicle operations. The electronic signals may be collected by vehicle on-board diagnostics (OBD) systems for further signal management.

The prior art suggests some alternatives for managing electronic signals. Since ECUs are not standardized, signal management thereof must be performed by the original equipment manufacturer (OEM) that provisions the ECUs. When a driver of the car (e.g. a person or an autonomous unit) detects a signal from a vehicle dashboard warning light, maintenance may be due. The maintenance process is subsequently carried out by decoupling an ECU or OBD system to be tested from the vehicle after an operation has been performed, and connecting it to large and complex electrical machines provisioned by the OEM such that specific tests can be carried out accordingly. This process has a plurality of obvious drawbacks, such as being costly, slow, static and inflexible. In addition, this process is lackluster in terms of interoperability because maintenance can only be carried out by the OEM (or related OEM workshops) provisioning the ECUs. Moreover, insufficient performance may sometimes not be detected in a timely manner in order to prevent ECU failure.

In recent years, vehicle telematics systems are becoming increasingly popular, especially with the rise of (at least partly) autonomously driven vehicles. In November 2022, the Global Automotive Telematics Market Report concluded that various regulations and standards stipulated by governments around the world are pushing towards the installation of embedded telematics devices in vehicles. Vehicle telematics systems offer a combination of IoT vehicle solutions, including e.g. GPS tracking or other telematics sensors, capable of externally reporting vehicle data during ongoing operation of the vehicle. Data transmission is effected through wireless networks from a vehicle computer to remote devices. The data can thus be remotely accessed by OEMs, and also by drivers and/or fleet telematics managers through OEM cloud service interfaces.

Despite vehicles ideally being equipped with embedded vehicle telematics systems, current prior art systems allow very limited opportunities for third parties to assess vehicle functionalities. ECU testing is limited to the static approaches provisioned by the associated OEM, as discussed above. Telematics services are also associated with many known drawbacks, such as power dependencies, privacy concerns, signal jamming, and high costs. Moreover, the data provided by such services is proprietarily maintained by the OEM and its distribution is hence limited, or at least essentially controlled by the OEM.

In light of the above observations, the present inventors have developed improvements in relation to vehicle run-time data management that solve the above-indicated deficiencies of the prior art.

SUMMARY

The present invention relates to providing circularity of vehicle run-time data. Run-time data circularity refers to the concept of enabling software developers access to all relevant data for assessing functionalities of vehicle components, and at the same time returning software tooling instructions from the developers to the vehicle providing the run-time data. This in turn provides updated run-time data which the developers may further assess, and so forth. Hence, data circularity between the developer and the vehicle is effectively enabled.

The objective of achieving data circularity is in a first aspect provisioned by a computerized system for cloud-based management of vehicle run-time data. The system comprises a cloud-based computing resource, a client-side platform and a signal broker device. The signal broker device is connected to one or more communication buses of a vehicle comprising one or more vehicle components and further configured for interfacing the cloud-based computing resource. The client-side platform comprises a tooling manager service. The cloud-based computing resource is configured to automatically log run-time data of an ongoing operation of said vehicle in one or more log files, the run-time data being indicative of electronic signals generated by the one or more vehicle components during the ongoing operation, and enable cloud-based access to said log files. The client-side platform is configured to access said log files from the cloud-based computing resource, by the tooling manager service, process the run-time data of the log files, and in response thereto, provide one or more software tooling instructions to the vehicle based on the run-time data of the log files, the software tooling instructions being adapted to assess functionalities of the one or more vehicle components.

Thanks to the data circularity enabled by the system of the first aspect, third parties can swiftly and cheaply assess functionalities of a vehicle, directly receive feedback of the result of the assessment, and act on this feedback. Hence, when stating that the software tooling instructions are provided based on the run-time data of the log files, it shall interpreted as providing the software tooling instructions with the knowledge of run-time data born in mind, or in response to having processed the run-time data. The software tooling instructions are thus not arbitrarily provided instructions since they are provided as a result of obtaining run-time data of a vehicle operation. Moreover, it is generally to be understood that the software tooling instructions as described are provided by one or more computerized units, possibly with the assistance of a human person. Such computerized units may be automated or conditional, for instance artificial neural networks or other appropriate machine learning model capable of autonomously generating software tooling instructions, that are configured to act on the feedback given (run-time data). Acting on the feedback enables timely assurance of compliance with safety and regulatory standards associated with the vehicle, customization of functionality prototyping, improvements of vehicle component performance which leads to, for instance, overall better energy efficiency and safety measures, and collaborate with other third parties for sharing ideas and further improving on the technical advantages as discussed above. Further technical effects are enabled from various embodiments of the invention and will be elaborated further upon in the detailed description of the embodiments.

In one or more embodiments, the log files comprise error data, the error data being run-time data deviating from predefined baseline vehicle data indicating an expected vehicle behaviour.

In one or more embodiments, the error data comprises a cause of one or more potential errors, and an indication of one or more vehicle components of the vehicle responsible for causing said one or more potential errors.

In one or more embodiments, the client-side platform is further configured to analyze the error data and include, with the software tooling instructions, a suggested action for resolving said one or more potential errors.

In one or more embodiments, the client-side platform is configured to provide the software tooling instructions irrespective of prevailing network connectivity.

In one or more embodiments, the client-side platform is configured to provide the software tooling instructions during said ongoing operation of the vehicle.

In one or more embodiments, said processing the run-time data comprises computing at least one software testing condition, said at least one software testing condition being one of a verification of vehicle configuration(s) and/or data for prototyping new or existing functionalities.

In one or more embodiments, said cloud-based access to the log files is device-agnostic.

In one or more embodiments, the cloud-based computing resource is configured to automatically log run-time data in response to a vehicle actuator event.

In one or more embodiments, the vehicle actuator event determines a duration of said automatic logging of run-time data.

In one or more embodiments, the vehicle actuator event is a manual activation of one or more user-controllable vehicle actuators.

In one or more embodiments, the actuator event is an automatic activation of one or more vehicle actuators.

In one or more embodiments, the cloud-based computing resource is configured to store log files of a completed operation of the vehicle, wherein said access to the log files is enabled for run-time data logged in one or more completed operations of the vehicle.

In a second aspect, a computer-implemented method for cloud-based management of vehicle run-time data is provided, wherein a signal broker device is connected to one or more communication buses of a vehicle comprising one or more vehicle components and further configured for interfacing the cloud-based computing resource. The method comprises, by the cloud-based computing resource, automatic logging of run-time data of an ongoing operation of the vehicle in one or more log files, the run-time data being indicative of electronic signals generated by the one or more vehicle components during the ongoing operation, and enabling cloud-based access to said log files. The method further comprises, by a client-side platform, accessing said log files from the cloud-based computing resource, processing the run-time data of the log files, and in response thereto providing one or more software tooling instructions to the vehicle based on the run-time data of the log files, the software tooling instructions being adapted to assess functionalities of the one or more vehicle components.

In a third aspect, a computer program product is provided. The computer program product comprises computer program code for performing the method according to the second aspect when the computer program code is executed by a processing device of the cloud-based computing resource and by a processing device of the client-side platform.

In further aspects of the disclosure, a computer program product may be provided comprising computer program code for performing the functionality defined for the cloud-based computing resource in the method according to the second aspect when the computer program code is executed by a processing device.

In further aspects of the disclosure, a computer program product may be provided comprising computer program code for performing the functionality defined for the client-side platform in the method according to the second aspect when the computer program code is executed by a processing device.

Similar advantages relating to the first aspect may also be realized for the second, third, and further aspects of the invention.

It should be emphasized that the term "comprises/comprising" when used in this specification is taken to specify the presence of stated features, integers, steps, or components, but does not preclude the presence or addition of one or more other features, integers, steps, components, or groups thereof. All terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION OF EMBODIMENTS

Figure 1:
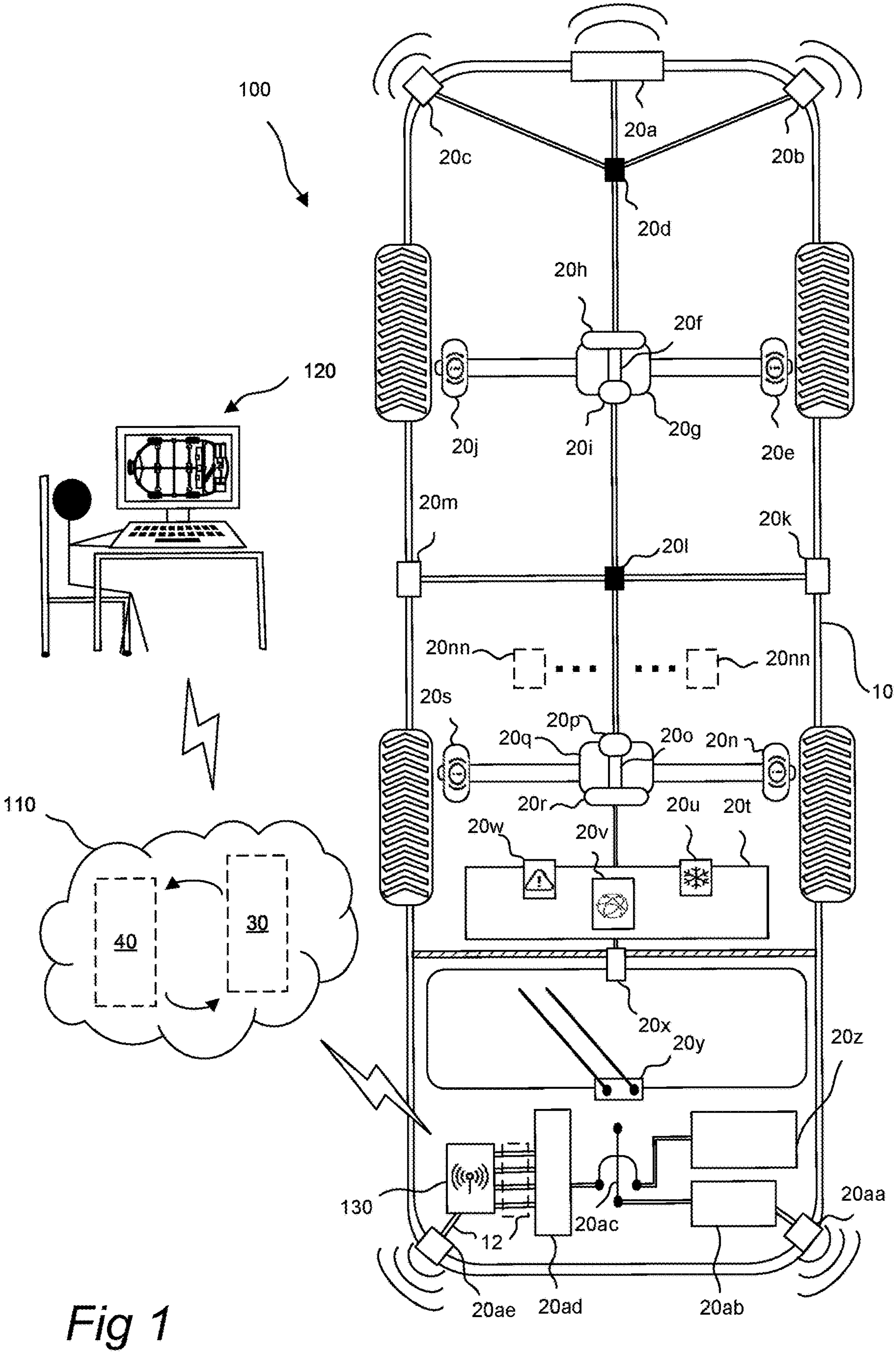
FIG. 1 is an embodiment of a computerized system configured for cloud-based management of vehicle run-time data.

Embodiments of the invention will now be described with reference to the accompanying drawings. The invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular embodiments illustrated in the accompanying drawings is not intended to be limiting of the invention. In the drawings, like numbers refer to like elements.

With reference to FIG. 1, an embodiment of a computerized (i.e. involving computerized units/modules/functionality/etc.) system 100 is visualized. The computerized system 100 comprises a cloud-based computing resource 110, a client-side platform 120 and a signal broker device 130. Technical details and respective components of these computerized units will be further described in one embodiment with reference to FIG. 3.

The computerized system 100 is configured for cloud-based management of vehicle run-time data. As seen in the figure, a vehicle 10 is provided. The vehicle 10 may be any type of vehicle comprising ECUs that can be tested. To this end, the vehicle 10 may be a car, truck, semi-truck, trailer, motorcycle, electric bike, aerial vehicle, maritime vehicle or train, to name a few vehicle types. The vehicle 10 comprises one or more vehicle components 20*a-nn*. The vehicle components 20*a-nn* may be any vehicle actuator (braking/steering/throttle control, etc.) or vehicle sensory system or subsystem (e.g. electronic control of windshields, air condition, network(s), wipers, etc.). The vehicle components 20*a-nn* shown in FIG. 1 are just exemplary components. The vehicle 10 may comprise any number of fewer or additional vehicle components 20*a-nn*. In FIG. 1, the components 20*a*, 20*b*, 20*c*, 20*aa*, 20*ae* are sensor devices (e.g. rear, side, front and back camera sensors), the components 20*d*, 20*f*, 20*g*, 20*h*, 20*i*, 201, 200, 20*p*, 20*q*, 20*r*, 20*z*, 20*ab*, 20*ad* are various powertrain control modules (e.g. transmission control, engine control, vehicle body control, and so forth), the components 20*e*, 20*j*, 20*n*, 20*s* are automatic braking modules, the components 20*k*, 20*m* are environmental sensors (e.g. rain, humidity, temperature sensors), the component 20*t* is a central vehicle computer, the component 20*u* is an air control module, the component 20*v* is a vehicle network, the component 20*w* is a warning control module, the component 20*x* is a vision camera system (e.g. for providing inputs to the central vehicle computer to be processed for subsequent autonomous vehicle control), the component 20*y* is a wiper control module and the component 20*ac* is a control connector.

The signal broker device 130 is connected to one or more communication buses 12 of the vehicle 10. The specific arrangement of the signal broker device 130 in the vehicle 10 as shown in FIG. 1 is just an exemplary connection to the components 20*ad*, 20*ae*. The signal broker device 130 may be connected to any one of the vehicle components 20*a-nn* through any number of communication buses 12. The signal broker device 130 is further configured for interfacing the cloud-based computing resource 110. An effect of arranging the signal broker device 130 to the vehicle 10 and configuring it for remote communication with the cloud-based computing resource 110 is that run-time data of an ongoing operation of the vehicle 10 is routed to the cloud-based computing resource 110 for further use. Hence, the signal broker device 130 enables the cloud-based computing resource 110 to automatically log run-time data of said ongoing operation of the vehicle 10. Run-time data is generally to be understood as data indicating electronic signals that are generated by the vehicle components 20*a-nn* during vehicle run-time.

An ongoing vehicle operation may be any type of operation associated with the vehicle 10 or any of its vehicle components 20*a-nn*. An ongoing vehicle operation may include a plurality of sub-operations executed by one or more of the vehicle components 20*a-nn*. The present disclosure manages run-time data of one or more of these sub-operations.

The cloud-based computing resource 110 is configured log the run-time data in one or more log files 30. The log files 30 thus comprise indications of electronic signals generated by the vehicle components 20*a-nn*.

The log files 30 may comprise error data. Error data is run-time data that deviates from predefined baseline vehicle data indicating an expected vehicle behaviour. To this end, the error data may be analyzed for determining whether the vehicle behaves as expected. An expected vehicle behaviour is interpreted as a vehicle, and more specifically vehicle components 20*a-nn*, that function according to stipulated safety, regulatory and/or performance standards set by the technical specifications of the components 20*a-nn*. The log files 30 comprising error data thus advantageously enable error management of electronic signals in the vehicle 10.

The error data may comprise a cause of one or more potential errors, and an indication of vehicle component(s) responsible for (or suspected of) causing said one or more potential errors. As an example, upon the run-time data of an automatic braking system deviating from predefined baseline vehicle data, this may be an indication of errors pertaining to the functionality of the automatic braking system, such as wheel slippage or faulty brake rotor engagement that negatively affects the performance. In this example, the potential error would correspond to poor braking performance. Further, the cause would correspond to wheel slippage or faulty brake rotor engagement. Finally, the vehicle component 20*a-nn* responsible for causing said error would be one of the automatic braking modules 20*e*, 20*j*, 20*n*, 20*s*. This will be further elaborated upon later on with reference to the embodiment illustrated by FIG. 2.

The cloud-based computing resource 110 may be configured to store log files 30 of completed operations of the vehicle 10. To this end, the cloud-based computing resource 110 is capable of providing run-time data of any number of previous vehicle operations. These may be logically stored in memory resources such that a plurality of different vehicle operations can be completed at any given time and/or simultaneously without any relevant run-time data of previous operations being rewritten. Run-time data can therefore be accessed both in real-time during the vehicle operation, or alternatively from previously completed operations without necessarily requiring the ongoing vehicle operation.

The cloud-based computing resource 110 may be configured to automatically log run-time data in response to a vehicle actuator event. A vehicle actuator event may be any actuation of a vehicle actuator (i.e. a component 20*a-nn* or part thereof) that is adapted to trigger a signal for initiating the automatic logging. The vehicle actuator event may be situation-driven or time-driven. In this sense, a developer may choose a timing for when desired logging of run-time data is to be performed, for instance upon the vehicle performing a certain action (e.g. travelling on a sloped road), the vehicle experiencing a certain external condition (e.g. heavy traffic), the vehicle first having initiated a set of starting conditions to prepare for the logging, and so forth. The skilled person realizes a plurality of different similar situations where selective logging of run-time data can be desired. Moreover, it would clearly depend on which vehicle component 20*a-nn* is being assessed.

To this end, the vehicle actuator event may be manually activated by one or more user controllable vehicle actuators. Alternatively, the vehicle actuator event may be an automatic activation of one or more vehicle actuators.

The vehicle actuator event may determine a duration of said automatic logging of run-time data. The duration may be fixed duration (10 seconds; 1 minute; 40 minutes; etc.), an actuator-dependent duration (i.e. the duration depends on what vehicle actuator is triggered), an active-status duration (i.e. the duration is pending for as long as some components 20*a-nn* of the vehicle 10 are operating), and so forth. Alternatively, the duration of said automatic logging may be pending from the time when a first vehicle actuator event is triggered until the time when a second actuator event is triggered. Hence, the vehicle actuator event may also trigger termination of the automatic logging.

The cloud-based computing resource 110 is further configured to enable cloud-based access to said log files 30. Cloud-based access allows remote control and management of vehicle run-time data. Preferably, the cloud-based access to the log files 30 is device-agnostic, i.e. both software and hardware agnostic (also known in the art as "device-agnosticism"). Accordingly, any user may be given access to the log files 30 during the ongoing operation in real-time and/or after any number of finished vehicle operations, no matter the type of device being in connection with the cloud-based computing resource 110.

The client-side platform 120 is configured to access the log files 30 from the cloud-based computing resource 110, for instance device-agnostically as discussed above. It is generally understood that a plurality of clients (human users or autonomous units) may access the log files 30 through the client-side platform 120.

The client-side platform 120 is further configured to provide, through the cloud-based computing resource 110, one or more software tooling instructions 40 to the vehicle 10. Hence, by means of the signal broker device 130 installed in the vehicle 10, the cloud-based computing resource 110 interfacing the signal broker 130 and logging run-time data, and the client-side platform 120 interfacing the cloud-based computing resource 110 and providing software tooling instructions 40, the data circularity as discussed in the "Summary" section is enabled, as indicated by the circulating arrows.

The client-side platform 120 may be configured to process the run-time data of the log files 30 and in response thereto provide the software tooling instruction(s) 40. To this end, the client-side platform 120 comprises data processing means capable of receiving the run-time data as input data, processing the input data, and outputting resulting software tooling instructions 40. The processing may comprise computing at least one software testing condition, wherein the software testing condition(s) being one of a verification of vehicle configuration(s) and/or data for prototyping new or existing functionalities. The client-side platform 120 may be configured to receive additional input from one or more users, a user being an autonomous unit or a human person.

The software tooling instructions 40 are adapted to assess functionalities of the vehicle components 20*a-nn*. The generated software tooling instructions 40 may thus assess functionalities by verifying that vehicle configuration(s) is/are accurate, i.e. that vehicle components 20*a-nn* function according to stipulated safety, regulatory and/or performance standards set by the technical specifications of the components 20*a-nn*. The software tooling instructions 40 may, additionally or alternatively, assess functionalities by prototyping new or existing functionalities.

Verifying that vehicle configuration(s) are accurate may involve providing a test suite that the cloud-based computing resource 110 is configured to execute. Executing the test suite may involve testing a set of vehicle components 20*a-nn* in relation to another set of vehicle components 20*a-nn*, where the set comprises one or more vehicle components 20*a-nn*. This is commonly referred to as integration testing in the art of software testing. The test suite may comprise one or more test cases corresponding to conditional and/or assertive test conditions that the execution of the test suite has to pass in order to verify the vehicle configuration(s). The test cases may be developed by a human software developer or an autonomous developer unit.

Prototyping new or existing functionalities may involve removing, adding or modifying one or more functionalities of one or more vehicle components 20*a-nn*. For instance, the person or autonomous unit operating at the client-side platform 120 may be incited to discover how performance is affected as indicated by the logged run-time data in the log files 30 upon data values of the wiper control module 20*y* being changed. To this end, the software tooling instructions 40 comprise the relevant data value changes. In addition, the software tooling instructions 40 for prototyping said new or existing functionalities may be complemented by the vehicle configuration(s) verification, for instance the test suite, as discussed above.

In embodiments where the log files 30 comprise error data, the client-side platform 120 may be further configured to analyze the error data. Because the client-side platform 120 has analyzed the error data, both the cause of potential error(s) and an indication of which vehicle component(s) 20*a-nn* that is/are responsible for causing the potential error(s) are known. In response thereto, suggested action(s) for resolving the one or more potential errors of the error data can be accordingly be taken. The suggested action(s) for resolving the error(s) is/are thus included in the software tooling instructions 40. Actions for resolving errors may be virtually any type of software-controllable action, such a change of data values or a connect/disconnect of data connection(s) between two or more of the vehicle components 20*a-nn*.

The client-side platform 120 may be configured to provide the software tooling instructions 40 irrespective of prevailing network connectivity. Hence, vehicle software development can be enabled both in offline and online mode, or any magnitude of reduced Internet connectivity therebetween. This advantageously allows testing of the vehicle 10 in locations typically associated with poor internet connectivity, such as underground locations, locations where signal jamming frequently occur, locations associated with substantial Internet traffic, and/or in developing countries with limited access to the Internet.

The client-side platform 120 may be configured to provide the software tooling instructions 40 during an ongoing operation of the vehicle 10. In this embodiment, the system 100 does not only enable logging of the run-time data during an ongoing vehicle operation, but also the assessment of functionalities by means of the software tooling instructions 40. To this end, access to log files 30 and/or provisioning of software tooling instructions 40 may be realized during or after a vehicle operation.

Figure 2:
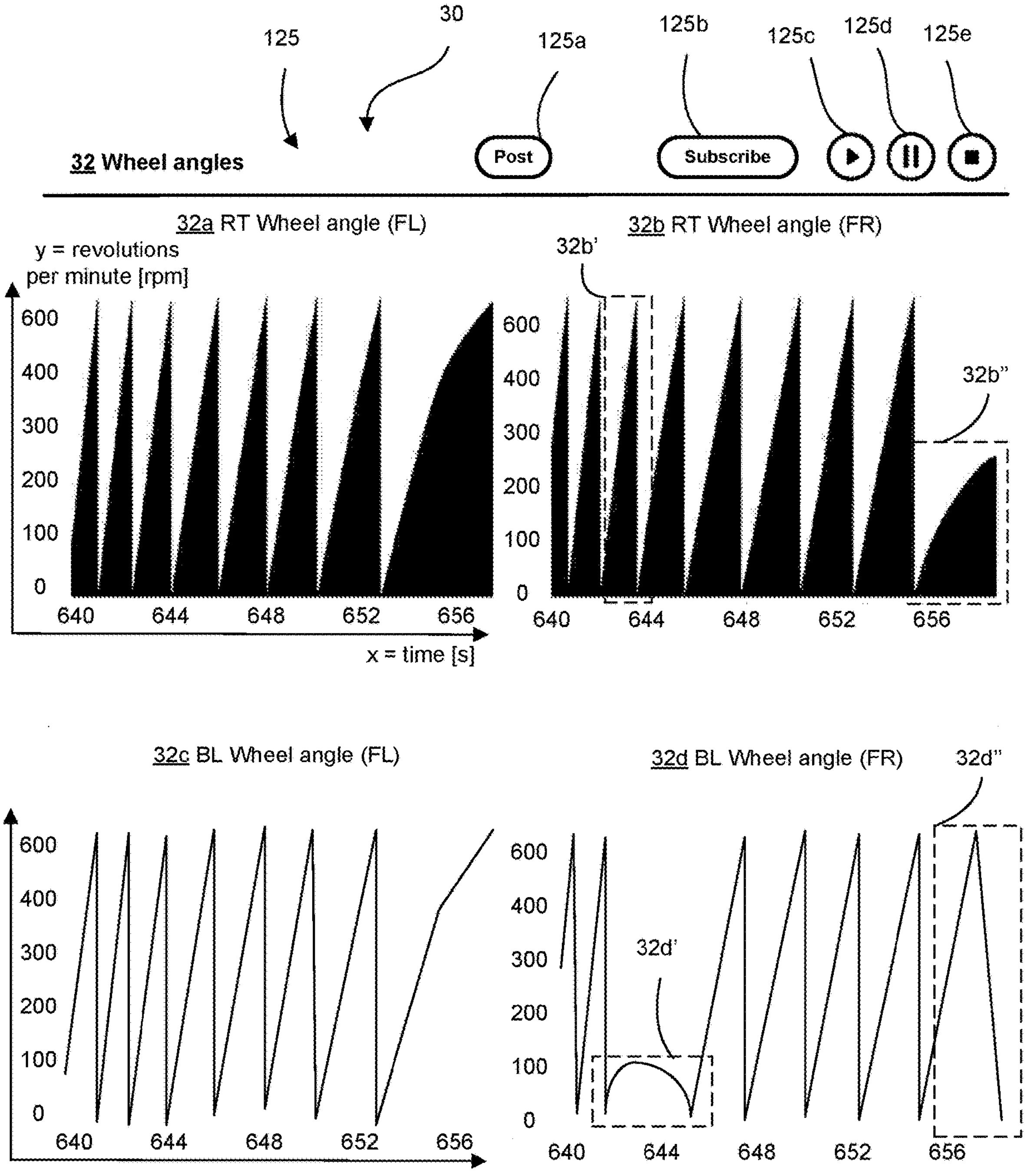
FIG. 2 show exemplary vehicle run-time data according to one embodiment.

FIG. 2 shows vehicle run-time data in a log file 30 according to one embodiment. The embodiment of FIG. 2 relates to a wheel angle log file 32. However, the skilled person will appreciate that the log file 30 may in other embodiments comprise any suitable additional or alternative log files associated with electronic signals generated by the vehicle components 20*a-nn* of the vehicle 10.

The run-time data may be accessed through the cloud-based computing resource 110 and presented in a graphical view 125 of the client-side platform. The graphical view 125 may comprise a plurality of various control functionalities. For instance, the graphical view 125 may comprise a post functionality 125*a*. The client-side platform may provide the software tooling instructions through the post functionality 125*a*. The graphical view 125 may further comprises a subscribe functionality 125*b* for subscribing to run-time data of a certain log file 30, in this example the wheel angle log file 32. The graphical view 125 may further comprise play 125*c*, pause 125*d* and stop 125*e* functionalities for controlling what run-time data that is to be accessed. The graphical view 125 is not limited to these particular functionalities 125*a-e*.

The wheel angle log file 32 according to the example data of FIG. 2 shows run-time data (RT) of a front left wheel angle 32*a* and run-time data (RT) of a front right wheel angle 32*b*. The wheel angles 32*a-b* are shown in diagrammatical illustrations where the respective x-axes denote run-time [s]. In this case the run-time data shows the front left/right wheel angles 32*a-b* between approximately 640 and 656 seconds in the ongoing vehicle operation. The respective y-axes denote the number of wheel revolutions per minute [rpm] during the vehicle operation. Further, the wheel angle log file 32 shows baseline (BL) data of the same wheels 32*c*, 32*d*. The run-time data of the front left wheel angle 32*a* seems to correspond to an expected vehicle behaviour according to the predefined baseline vehicle data of the front left wheel angle 32*c*. Hence, no action seems to be necessary. However, the system has identified run-time data 32*b*', 32*b*" that deviates from an expected vehicle behaviour according to the baseline vehicle data of the front right wheel angle 32*d*', 32*d*". This is an indication that the wheel angle log file 32 comprises error data approximately around the time units 644 and 656. The client-side platform 120 may accordingly act on this information by providing one or more software tooling instructions, for instance via the post functionality 125*a*, to the vehicle for assessing the wheel control functionality.

Figure 3:
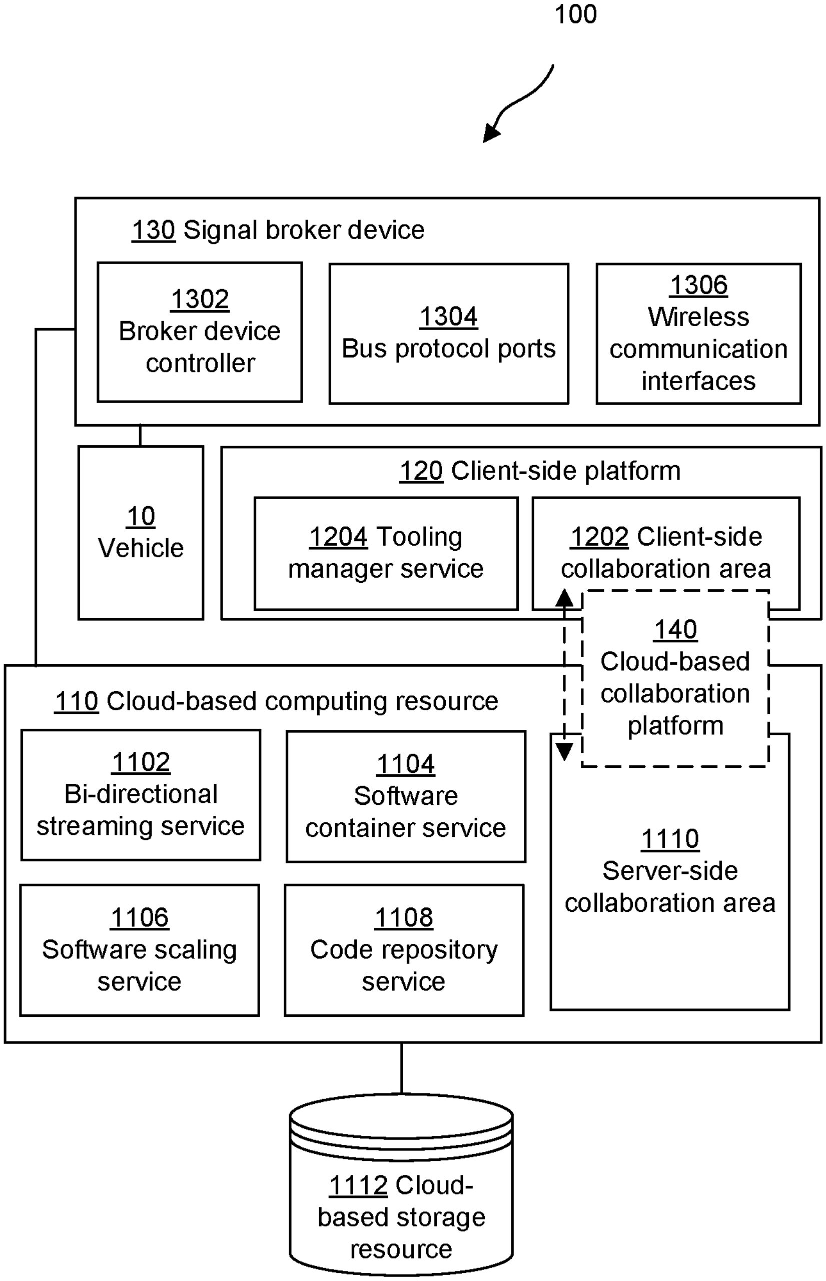
FIG. 3 is an exemplary detailed illustration of a computerized system according to one embodiment.

With reference to FIG. 3, a computerized system 100 is shown according to an exemplary embodiment. The system 100 may be the system as explained with reference to FIG. 1. The system 100 comprises a cloud-based computing resource 110, a client-side platform 120, a cloud-based collaboration platform 140 and a signal broker device 130. Further, the signal broker device 130 is connected to a vehicle 10.

The cloud-based computing resource 110 may be hosted on a cloud-based server being implemented using any commonly known cloud-computing platform technologies, such as Amazon Web Services, Google Cloud Platform, Microsoft Azure, DigitalOcean, Oracle Cloud Infrastructure, IBM Bluemix or Alibaba Cloud. The cloud-based server may be included in a distributed cloud network that is widely and publically available, or alternatively limited to an enterprise. Alternatively, the server may in some embodiments be locally managed as e.g. a centralized server unit.

The cloud-based computing resource 110 may be in operative communication with a cloud-based storage resource 1112. The cloud-based storage resource 1112 may be maintained by and/or configured as a cloud-based service, being included with or external to the cloud-based computing resource 110. Connection to cloud-based storage means may be established using DBaaS (Database-as-a-service). For instance, cloud-based storage means may be deployed as a SQL data model such as MySQL, PostgreSQL or Oracle RDBMS. Alternatively, deployments based on NoSQL data models such as MongoDB, Amazon DynamoDB, Hadoop or Apache Cassandra may be used. DBaaS technologies are typically included as a service in the associated cloud-computing platform.

The cloud-based computing resource 110 may comprise a bi-directional streaming service 1102. The bi-directional streaming service 1102 may be based on any known remote procedure call technology known in the art, such as gRPC. As is well known, remote procedure call technologies apply protocol buffers (Protobuf) instead of JSON/XML message formats, thus typically including significantly smaller message sizes. The bi-directional streaming service 1102 may include an endpoint probe, where the client-side platform 120 being in communication with the cloud-based computing resource 110 comprises another endpoint probe for enabling communication therebetween.

The cloud-based computing resource 110 may comprise a software container service 1104 adapted to deliver software containers to an operating system kernel of the system 100. Alternatively, the software container service 1104 may be complemented with or replaced by a virtual machine service. Software containers are capable of storing application data and related metadata that can run on any operating system. This in turn enables applications to be executed in various locations, e.g. on-premises, in public clouds or private clouds. The software container service 1104 may be based on any container service known in the art, such as Docker.

The cloud-based computing resource 110 may comprise a software scaling service 1106. The software scaling service 1106 may be configured for automating deployment of the software container service 1104. The software scaling service 1106 may be based on any scaling technologies known in the art, such as Kubernetes.

The cloud-based computing resource 110 may comprise a code repository service 1108. The code repository service 1108, or at least parts thereof, may alternatively be stored in the cloud-based storage resource 1112. The code repository service 1108 includes metadata associated with simulation files or otherwise test-related files. The code repository service 1108 may be based on any repository technologies known in the art, such as Git.

The cloud-based collaboration platform 140 comprises a client-side collaboration area 1202 and a server-side collaboration area 1110. Generally, the cloud-based collaboration platform 140 is adapted to manage all user interactions with the system 100, including user interactions between the client-side platform 120 and the cloud-based computing resource 110, as well as (collaborative) user interactions between instances of the client-side platform 120. To this end, it should be understood that the client-side platform 120 is not unique. The client-side platform 120 may involve a plurality of instances such that a plurality of persons operating respective instances of the client-side platform 120 may collaborate. Collaboration data may include any information that may be used for the assessment of vehicle component functionalities, such as run-time data accessed through the cloud-based computing resource 110, software tooling instructions, test-related files, and so forth. The collaboration data may be supplied from and provided to the cloud-based computing unit 110, for instance through the server-side collaboration area 1110.

Advantageously, as discussed before, the cloud-based collaboration platform 140 is both software and hardware. The client-side collaboration area 1202 enables users of the system 100 to assess vehicle functionalities. The client-side collaboration area 1202 thus functions as an excellent debug environment for prototyping new or existing functionalities, verifying vehicle configurations and/or experimenting with design ideas, to name a few advantages. This is indicated by the dashed arrow. While doing so, all (or some) information of the system 100 may be shared with other users through instances of the client-side platform 120 for incentivizing and encouraging collaboration in a device-agnostic manner.

The client-side platform 120 further comprises a tooling manager service 1204. The tooling manager service 1204 is configured for retrieving run-time data, processing said run-time data, and outputting resulting software tooling instructions. This was described according to some examples with reference to FIG. 1.

The tooling manager service 1204 may comprise a microcomputer comprising a processing unit being a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The microcomputer may include one or more memories being non-volatile memories (e.g., read-only memories (ROM), erasable programmable read-only memories (EPROM), electrically erasable programmable read-only memories (EEPROM), etc.), and volatile memories (e.g., random-access memories (RAM)), or any other medium which can be used to carry or store desired program code in the form of machine-executable instructions or data structures and which can be accessed by a computer or other machine with a processor device.

In some embodiments, the tooling manager service 1204 is implemented as a machine learning model. The machine learning model may be configured to process run-time data of the ongoing vehicle operation in order to intelligently determine suitable software tooling instructions. To this end, the machine learning model may comprise self-learning features. The machine learning model may be trained on a dataset comprising previously retrieved run-time data. Whenever additional run-time data is retrieved, for instance from the log files, the machine learning model may thus perform autonomous classifications of suitable actions to take based on circumstances relating to said previously retrieved run-time data, e.g. when it was retrieved, how it was retrieved, for how long periods, during what vehicle operation, and so forth. The classifications may, for instance, relate to vehicle configuration verification or prototyping of new and/or existing vehicle functionalities. The machine learning model may implement any known supervised or unsupervised learning algorithm known in the art, such as binary, multi-class, or multi-label classification and/or clustering algorithms. For instance, algorithms such as logistic regression, support vector machines, kernel estimation, decision trees and/or neural networks may be utilized. Additionally, the machine learning model may learn from previous classifications by implementing a backpropagation algorithm.

As has been described with reference to FIG. 1, the signal broker device 130 is configured to interface the cloud-computing resource 110 and be connected to the vehicle 10. The signal broker device 130 may comprise a broker device controller 1302, one or more bus protocol ports 1304 and one or more wireless communication interfaces 1306.

The bus protocol ports 1304 are adapted to be connected to the various communication buses of the vehicle, as was discussed in conjunction with FIG. 1. Since different OEMs use different protocols and no one has yet to be set as standard, the signal broker device 130 is not limited to be connected to one particular type. For instance, the bus protocol ports 1304 may include connectors to communication buses including but not limited to $A^2B$, AFDX, ARINC 429, Byteflights, CAN, D2B, Ethernet, FlexRay, IDB-1394, IEBus, $I^2C$, ISO 9141-1/-2, J1708, J1587, J1850, J1939, ISO 11783, KWP2000, LIN, MOST, Multifunction Vehicle Bus, SMARTwireX, SPI, VAN or UAVCAN. Moreover, the connection is not limited to any particular type of physical transmission media. For instance, the physical transmission media include fibre optic, single wire, twisted pair, IEEE 1394, MIL-STD-1553, MIL-STD-1773 or Power-line communication, to name a few.

The wireless communication interfaces 1306 may comprise any short-range or long-range wireless communication standards known in the art. For instance, the wireless communication interfaces 1306 may support technologies based on IEEE 802.11, IEEE 802.15, ZigBee, WirelessHART, WiFi, Bluetooth®, BLE, RFID, WLAN, MQTT IoT, CoAP, DDS, NFC, AMQP, LoRaWAN, Z-Wave, Sigfox, Thread, EnOcean, mesh communication, or any other form of proximity-based device-to-device radio communication signal such as LTE Direct, W-CDMA/HSPA, GSM, UTRAN, LTE or Starlink.

Instead of or in addition to the wireless communication interfaces 1306, the signal broker device 130 may comprise one or more wired communication interfaces, such as an Ethernet interface for TCP/IP communication.

The broker device controller 1302 may be a microcomputer adapted to enable the functionality of the signal broker device 130. The microcomputer may include a processing unit being a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The microcomputer may include one or more memories being non-volatile memories (e.g., read-only memories (ROM), erasable programmable read-only memories (EPROM), electrically erasable programmable read-only memories (EEPROM), etc.), and volatile memories (e.g., random-access memories (RAM)), or any other medium which can be used to carry or store desired program code in the form of machine-executable instructions or data structures and which can be accessed by a computer or other machine with a processor device. As an example, the functionality of the microcomputer may be implemented on a Raspberry Pi or other cheap and lightweight broker solutions.

Although not explicitly shown in FIG. 3, the system 100 may include a number of units known to the skilled person for implementing the functionalities as described in the present disclosure. The system 100 may comprise one or more computing units capable of including firmware, hardware, and/or executing software instructions to implement the functionality described herein. The system 100 may comprise one or more processor devices (may also be referred to as a control unit), memories and buses. The system may include at least one computing device having the processor device. A system bus provides an interface for system components including, but not limited to, the memory and the processor device. The processor device may include any number of hardware components for conducting data or signal processing or for executing computer code stored in memory. The processor device (e.g., control unit) may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processor device may further include computer executable code that controls operation of the programmable device.

The system bus may be any of several types of bus structures that may further interconnect to a memory bus (with or without a memory controller), a peripheral bus, and/or a local bus using any of a variety of bus architectures. The memory may be one or more devices for storing data and/or computer code for completing or facilitating methods described herein. The memory may include database components, object code components, script components, or other types of information structure for supporting the various activities herein. Any distributed or local memory device may be utilized with the systems and methods of this description. The memory may be communicably connected to the processor device (e.g., via a circuit or any other wired, wireless, or network connection) and may include computer code for executing one or more processes described herein. The memory may include non-volatile memory (e.g., read-only memory (ROM), erasable programmable read-only memory (EPROM), electrically erasable programmable read-only memory (EEPROM), etc.), and volatile memory (e.g., random-access memory (RAM)), or any other medium which can be used to carry or store desired program code in the form of machine-executable instructions or data structures and which can be accessed by a computer or other machine with a processor device. A basic input/output system (BIOS) may be stored in the non-volatile memory and can include the basic routines that help to transfer information between elements within the computer system.

Figure 4:
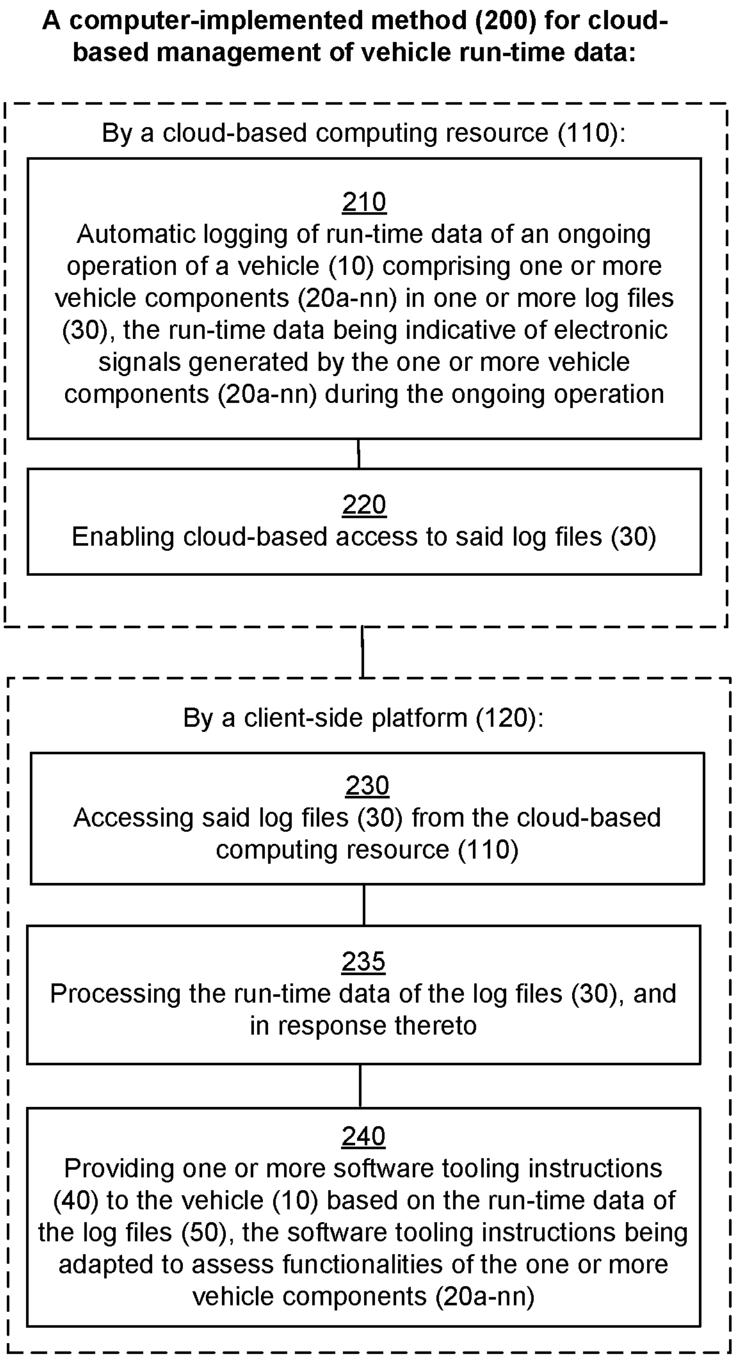
FIG. 4 is a flowchart illustration of a computer-implemented method for cloud-based management of vehicle run-time data.

With reference to FIG. 4, a computer-implemented method 200 for cloud-based management of vehicle run-time data is shown. The method 200 is adapted to implement the functionality of the computerized system 100 as has been described herein, wherein a signal broker device 130 is connected to one or more communication buses 12 of a vehicle 10 comprising one or more vehicle components 20*a-nn* and further configured for interfacing the cloud-based computing resource 110.

The method 200 comprises, by the cloud-based computing resource 110, automatic logging 210 of run-time data of an ongoing operation of the vehicle 10 in one or more log files 30. The run-time data is indicative of electronic signals generated by the one or more vehicle components 20*a-nn* during the ongoing operation. The method 200 further comprises, by the cloud-based computing resource 110, enabling 220 cloud-based access to said log files 30. The method 200 further comprises, by a client-side platform 120, accessing 230 said log files 39 from the cloud-based computing resource 110. The method 200 further comprises, by the client-side platform 120, providing 240 one or more software tooling instructions 40 to the vehicle 10 based on the run-time data of the log files 30. The software tooling instructions 40 are adapted to assess functionalities of the one or more vehicle components 20*a-nn*.

Figure 5:
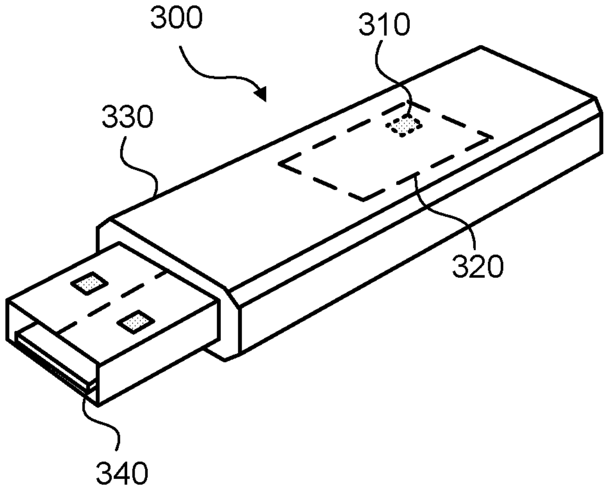
FIG. 5 is a computer-readable storage medium according to one embodiment.

With reference to FIG. 5, a schematic illustration of a computer-readable medium 300 is shown according to one exemplary embodiment. The computer-readable medium 300 may be associated with or connected to the system 100 as described herein, and is capable of storing a computer program product 310. The computer-readable medium 300 in the disclosed embodiment is a memory stick, such as a Universal Serial Bus (USB) stick. The USB stick 300 comprises a housing 330 having an interface, such as a connector 340, and a memory chip 320. In the disclosed embodiment, the memory chip 320 is a flash memory, i.e. a non-volatile data storage that can be electrically erased and re-programmed. The memory chip 320 stores the computer program product 310 which is programmed with computer program code (instructions) that when loaded into a processing device, will perform a method, for instance the entire method 200 explained with reference to FIG. 4, or the functionality defined in the method 200 for the cloud-based computing resource 110, or the functionality defined in the method 200 for the client-side platform 120. The USB stick 300 is arranged to be connected to and read by a reading device for loading the instructions into the processing device. It should be noted that a computer-readable medium can also be other mediums such as compact discs, digital video discs, hard drives or other memory technologies commonly used. The computer program code (instructions) can also be downloaded from the computer-readable medium via a wireless interface to be loaded into the processing device.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A computerized system for cloud-based management of vehicle runtime data, the system comprising:
- a cloud-based computing resource;
- a client-side platform; and
- a signal broker device;
- wherein the signal broker device is connected to one or more communication buses of a vehicle that includes one or more vehicle components and further configured for interfacing the cloud-based computing resource;
- wherein the client-side platform includes a tooling manager service;
- wherein the cloud-based computing resource is configured to:
  - automatically log run-time data of an ongoing operation of the vehicle in one or more log files, the run-time data being indicative of electronic signals generated by the one or more vehicle components during the ongoing operation, and
  - enable cloud-based access to the log files; and
- wherein the client-side platform is configured to:
  - access the log files from the cloud-based computing resource,
  - by the tooling manager service, process the run-time data of the log files, and in response thereto, provide one or more software tooling instructions to the vehicle based on the run-time data of the log files, the software tooling instructions being adapted to assess functionalities of the one or more vehicle components.

2. The system according to claim 1, wherein the log files comprise error data, the error data being run-time data deviating from predefined baseline vehicle data indicating an expected vehicle behaviour.

3. The system according to claim 2, wherein the error data comprises:

a cause of one or more potential errors, and an indication of one or more vehicle components of the vehicle responsible for causing the one or more potential errors.

4. The system according to claim 2, wherein the client-side platform is further configured to analyze the error data and include, with the software tooling instructions, a suggested action for resolving the one or more potential errors.

5. The system according to claim 1, wherein the client-side platform is configured to provide the software tooling instructions irrespective of prevailing network connectivity.

6. The system according to claim 1, wherein the client-side platform is configured to provide the software tooling instructions during the ongoing operation of the vehicle.

7. The system according to claim 1, wherein processing the run-time data comprises computing at least one software testing condition, the at least one software testing condition being one of a verification of vehicle configuration(s) and/or data for prototyping new or existing functionalities.

8. The system according to claim 1, wherein the cloud-based access to the log files is device-agnostic.

9. The system according to claim 1, wherein the cloud-based computing resource is configured to automatically log run-time data in response to a vehicle actuator event.

10. The system according to claim 9, wherein the vehicle actuator event determines a duration of the automatic logging of run-time data.

11. The system according to claim 9, wherein the vehicle actuator event is a manual activation of one or more user-controllable vehicle actuators.

12. The system according to claim 9, wherein the vehicle actuator event is an automatic activation of one or more vehicle actuators.

13. The system according to claim 1, wherein the cloud-based computing resource is configured to store log files of a completed operation of the vehicle, wherein the access to the log files is enabled for run-time data logged in one or more completed operations of the vehicle.

14. A computer-implemented method for cloud-based management of vehicle run-time data, wherein a signal broker device is connected to one or more communication buses of a vehicle that includes one or more vehicle components and further configured for interfacing a cloud-based computing resource, the method comprising:

by the cloud-based computing resource, automatic logging of run-time data of an ongoing operation of the vehicle in one or more log files, the run-time data being indicative of electronic signals generated by the one or more vehicle components during the ongoing operation, and enabling cloud-based access to the log files; and by a client-side platform, accessing the log files from the cloud-based computing resource, processing the run-time data of the log files, and in response thereto, providing one or more software tooling instructions to the vehicle based on the run-time data of the log files, the software tooling instructions being adapted to assess functionalities of the one or more vehicle components.

15. A computer program product comprising computer program code for performing the method according to claim 14 when the computer program code is executed by a processing device of the cloud-based computing resource and by a processing device of the client-side platform.

* * * * *